United States Patent
Sun et al.

(10) Patent No.: US 10,615,723 B2
(45) Date of Patent: Apr. 7, 2020

(54) MULTI-PHASE BRUSHLESS DC MOTOR DRIVING CIRCUIT

(71) Applicant: Energic Technologies Corp., Hsinchu (TW)

(72) Inventors: Chien-Ming Sun, Kaohsiung (TW); Sheng-Hung Lin, Hsinchu County (TW); Yi-Ting Ko, Changhua County (TW)

(73) Assignee: ENERGIC TECHNOLOGIES CORP., Hsinchu (TW)

(*) Notice: Subject to any disclaimer, the term of this patent is extended or adjusted under 35 U.S.C. 154(b) by 0 days.

(21) Appl. No.: 16/136,398

(22) Filed: Sep. 20, 2018

(65) Prior Publication Data
US 2019/0097553 A1 Mar. 28, 2019

(30) Foreign Application Priority Data
Sep. 25, 2017 (TW) .................. 106132804

(51) Int. Cl.
| H02P 6/15 | (2016.01) |
| H02M 7/5387 | (2007.01) |
| H02M 1/38 | (2007.01) |
| H02P 6/28 | (2016.01) |
| H02P 27/08 | (2006.01) |
| H02M 1/00 | (2006.01) |

(52) U.S. Cl.
CPC ............... *H02P 6/15* (2016.02); *H02M 1/38* (2013.01); *H02M 7/5387* (2013.01); *H02M 7/53871* (2013.01); *H02P 6/28* (2016.02); *H02P 27/08* (2013.01); *H02M 2001/0009* (2013.01); *H02M 2001/385* (2013.01)

(58) Field of Classification Search
CPC ...................................... H02P 6/15; H02P 6/28
USPC ............................. 318/400.13, 400.01, 700
See application file for complete search history.

(56) References Cited

U.S. PATENT DOCUMENTS

| 8,080,957 B2 * | 12/2011 | Miura ...................... H02P 6/10 318/400.01 |
| 9,362,860 B2 * | 6/2016 | Sugawara ................. H02P 6/28 |

(Continued)

FOREIGN PATENT DOCUMENTS

| CN | 1411134 A | 4/2003 |
| TW | 200635202 A | 10/2006 |

(Continued)

*Primary Examiner* — David Luo
(74) *Attorney, Agent, or Firm* — Li & Cai Intellectual Property (USA) Office

(57) ABSTRACT

A multi-phase brushless DC motor driving circuit includes a driving-stage circuit, a PWM generator, a control circuit and a plurality of current detection circuits. The driving-stage circuit includes a plurality of sub-driving circuits each having a high-side transistor and a low-side transistor. The current detection circuits detect the current at a node between the high-side transistor and the low-side transistor of the corresponding sub-driving circuit, and then generate a current detection signal. According to the current detection signals, the control circuit controls the PWM generator to generate a plurality of PWM signals for controlling the conducting and cutting off of the high-side transistor and the low-side transistor of each sub-driving circuit, and to provide a driving current to drive a multi-phase brushless DC motor.

16 Claims, 6 Drawing Sheets

(56) References Cited

U.S. PATENT DOCUMENTS

| | | | |
|---|---|---|---|
| 9,548,688 B2* | 1/2017 | Satou | ............... H02P 21/22 |
| 2007/0290640 A1 | 12/2007 | Williams et al. | |

FOREIGN PATENT DOCUMENTS

| TW | 200830694 A | 7/2008 |
|---|---|---|
| TW | 201611509 A | 3/2016 |

* cited by examiner

MULTI-PHASE BRUSHLESS DC MOTOR DRIVING CIRCUIT

CROSS-REFERENCE TO RELATED PATENT APPLICATION

This application claims the benefit of priority to Taiwan Patent Application No. 106132804, filed on Sep. 25, 2017. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a multi-phase brushless DC motor driving circuit, and more particularly to a multi-phase brushless DC motor driving circuit capable of performing a compensation for delay time (also referred to as dead time).

BACKGROUND OF THE DISCLOSURE

Reference is made to FIG. 1, which is a schematic view illustrating a conventional multi-phase brushless DC motor driving circuit. When the conventional multi-phase brushless DC motor driving circuit drives a brushless direct current (BLDC) motor, the multi-phase brushless DC motor will detect a current location of a rotor (e.g., a coil Cu, a coil Cv and a coil Cw). Then, a micro control unit (MCU) 3 controls a pulse width modulation (PWM) generator 2 according to a motor speed signal and a detecting signal, which represents the current location of the coil Cu, the coil Cv and the coil Cw, to generate PWM signals u-w and x-z to control the conducting and cutting off of a plurality of high-side transistors U-W and low-side transistors X-Z in a driving-stage circuit 1.

Considering that a converting time exists when the transistor is converted from a conductive state to a cut off state or from a cut off state to a conductive state, in order to prevent the high-side transistors U-W and the low-side transistors X-Z from being conducted at the same time, which may cause circuits to burn out, the PWM signals u-w of the high-side transistors U-W and the PWM signals x-z of the low-side transistors X-Z are complementary signals, and the transition edges in the PWM signals u-w of the high-side transistors U-W and in the PWM signals x-z of the low-side transistors X-Z are delayed for a period of time when generating the PWM signals u-w and x-z to control the high-side transistors U-W and the low-side transistors X-Z. Generally, the delay time is called dead time.

Reference is made to FIG. 2A and FIG. 2B, which are waveform views of the conventional multi-phase brushless DC motor driving circuit.

As shown in FIG. 2A, the rising edges in the PWM signal u and the PWM signal x for the high-side transistor U and the low-side transistor X are respectively delayed for a period of time Td to alternately conduct the high-side transistor U and the low-side transistor X. When the multi-phase brushless DC motor MT is driven, during the time when the current flows from the multi-phase brushless DC motor MT to the node UO, the voltage VUO of the node UO is shown in FIG. 2A (in which the threshold voltage of a body diode of the low-side transistor X is Vd, and the supply voltage of the driving-stage circuit 1 is VDD, details of which are omitted herein). In other words, as also shown in FIG. 2B, the rising edges in the PWM signal u and the PWM signal w for the high-side transistor U and the low-side transistor W respectively are delayed for the period of time Td to alternately conduct the high-side transistor U and the low-side transistor X. When the multi-phase brushless DC motor MT is driven, during the time when the current flows from the node UO to the multi-phase brushless DC motor MT, the voltage VUO of the node UO is shown in FIG. 2B (in which the threshold voltage of a body diode of the low-side transistor X is Vd, and the supply voltage of the driving-stage circuit 1 is VDD, details of which are omitted herein).

Assuming that the cycle of the non-adjustment PWM signal is T and the time of a high potential is Ton, according to the voltage VUO of the node UO in FIG. 2A, when the multi-phase brushless DC motor MT is driven, during the time when the current flows from the node UO to the multi-phase brushless DC motor MT, an equivalent duty cycle of the driving-stage circuit would be (Ton-Td)/T. In addition, according to the voltage VUO of the node UO in FIG. 2B, when the multi-phase brushless DC motor MT is driven, during the time when the current flows from the multi-phase brushless DC motor MT to the node UO, the equivalent duty cycle of the driving-stage circuit is (Ton+Td)/T.

Since the PWM signal u and the PWM signal w provided for the high-side transistor U and the low-side transistor W are complementary signals, if the duty cycle of the high-side transistor U is D % (i.e., Ton/T in FIG. 2A), the duty cycle of the low-side transistor W would be (100-D) % (i.e., Ton/T in FIG. 2B). Therefore, when the multi-phase brushless DC motor MT is driven, the overall equivalent duty cycle of the driving-stage circuit would be (D %-Td %)-[(100-D) %+Td %], which is equal to (2D-100-2Td) %.

Accordingly, by delaying the transition edges of the PWM signals of the high-side transistor and the low-side transistor for a period of time, even though the situation that the high-side transistor and the low-side transistor in the driving-stage circuit are conducted at the same time can be prevented, the overall equivalent duty cycle of the driving-stage circuit will be shortened due to the delay time so that the operation efficiency of the motor is reduced.

SUMMARY OF THE DISCLOSURE

In order to prevent the high-side transistor and the low-side transistor from being conducted at the same time and maintain the operation efficiency of the motor, the present disclosure provides a multi-phase brushless DC motor driving circuit which does not shorten the equivalent duty cycle of the driving-stage circuit due to the delay time.

In response to the above-referenced technical inadequacies, the present disclosure provides a multi-phase brushless DC motor driving circuit for providing a driving current to drive a multi-phase brushless DC motor. The multi-phase brushless DC motor includes a driving-stage circuit, a pulse width modulation generator, a control circuit and a plurality of current detection circuits. The driving-stage circuit includes a plurality of sub-driving circuits, which are parallel to each other, each of the sub-driving circuits having a high-side transistor and a low-side transistor. The PWM generator is connected to the driving-stage circuit. The control circuit is connected to the PWM generator. The current detection circuits are respectively connected between the driving-stage circuit and the control circuit, and configured to detect currents at a node between the high-side transistor and the low-side transistor to generate a plurality of current detection signals. The control circuit controls the PWM generator according to the current detection signals to generate a plurality of PWM signals and control the conducting and cutting off of the high-side transistor and the low-side transistor at each of the sub-driving circuits so as to provide the driving current to drive the multi-phase brushless DC motor.

In response to the above-referenced technical inadequacies, the present disclosure provides a multi-phase brushless DC motor driving circuit for providing a driving current to drive a multi-phase brushless DC motor, and the multi-phase brushless DC motor driving circuit includes a driving-stage circuit, a PWM generator and a correction detection circuit. The driving-stage circuit includes a plurality of sub-driving circuits, which are parallel to each other, and each of the sub-driving circuits has a high-side transistor and a low-side transistor. The PWM generator is connected to the driving-stage circuit. The control circuit is connected to the PWM generator. The current detection circuit is respectively connected between the driving-stage circuit and the control circuit, and configured to detect a current at a node between the high-side transistor and the low-side transistor to generate a current detection signal. The control circuit performs a calculation according to the current detection signal to control the PWM generator to generate a plurality of PWM signals and control the conducting and cutting off of the high-side transistor and the low-side transistor at each of the sub-driving circuits so as to provide the driving current to drive the multi-phase brushless DC motor.

In one embodiment of the multi-phase brushless DC motor driving circuit, the control circuit calculates a current signal of the node between the high-side transistor and the low-side transistor among the sub-driving circuits according to the current detection signal. According to the current detection signal with high potential or low potential, the control circuit determines that the current flows to or flows from the node between the high-side transistor and the low-side transistor among the sub-driving circuits. When the current flows from the node between the high-side transistor and the low-side transistor among the sub-driving circuits, the control circuit controls the PWM generator to generate a predetermined PWM signal to the high-side transistor of the sub-driving circuit, and to generate an adjustment PWM signal to the low-side transistor of the sub-driving circuit. On the other hand, when the current flows to the node between the high-side transistor and the low-side transistor among the sub-driving circuits, the control circuit controls the PWM generator to generate a PWM signal, which is complementary to the predetermined PWM signal, to the low-side transistor of the sub-driving circuit, and generates another adjustment PWM signal to the high-side transistor of the sub-driving circuit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, in which.

DETAILED DESCRIPTION OF THE EXEMPLARY EMBODIMENTS

Figure 1:
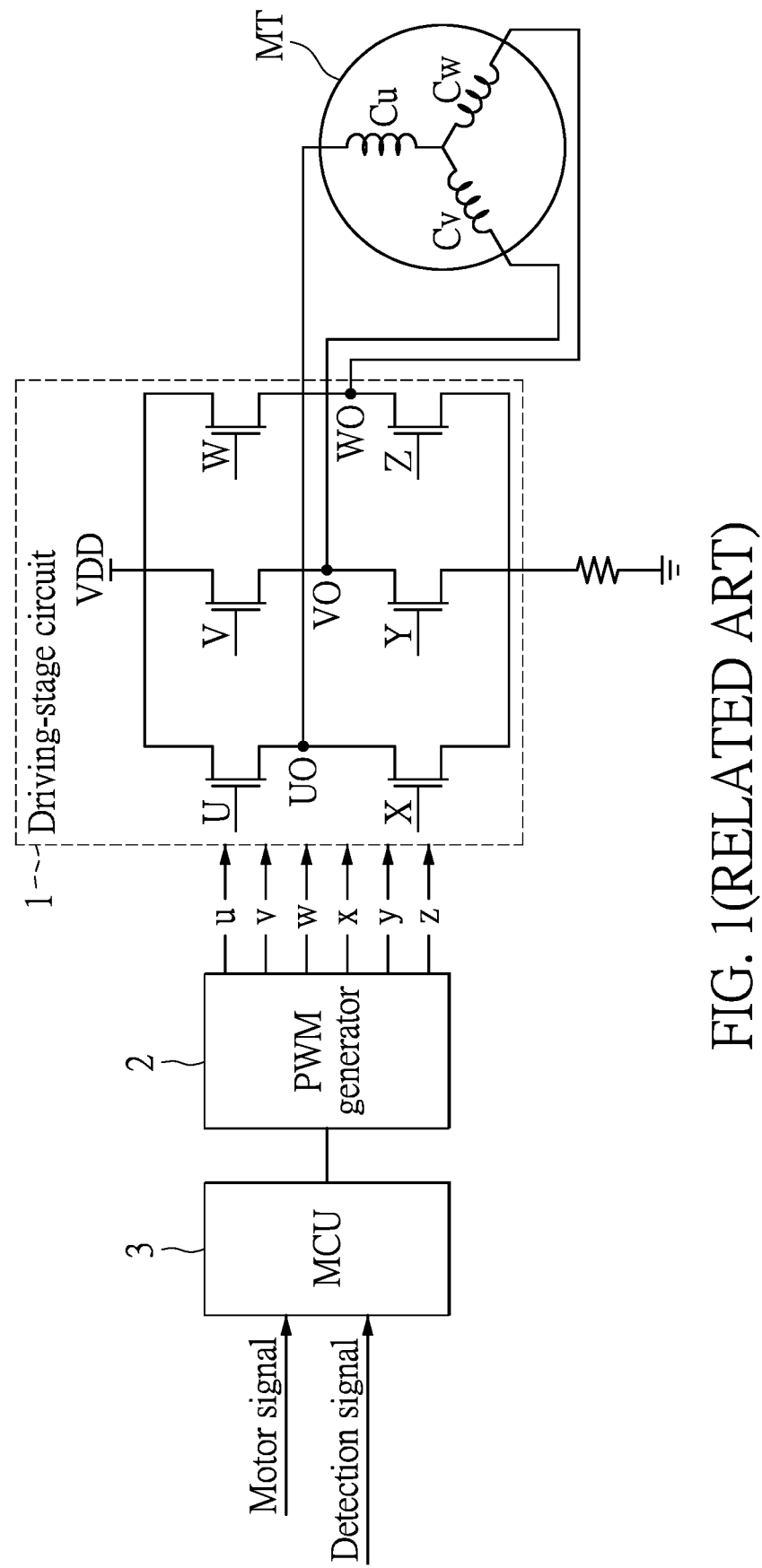
FIG. 1 is a schematic view illustrating a conventional multi-phase brushless DC motor driving circuit.
Figure 2A:
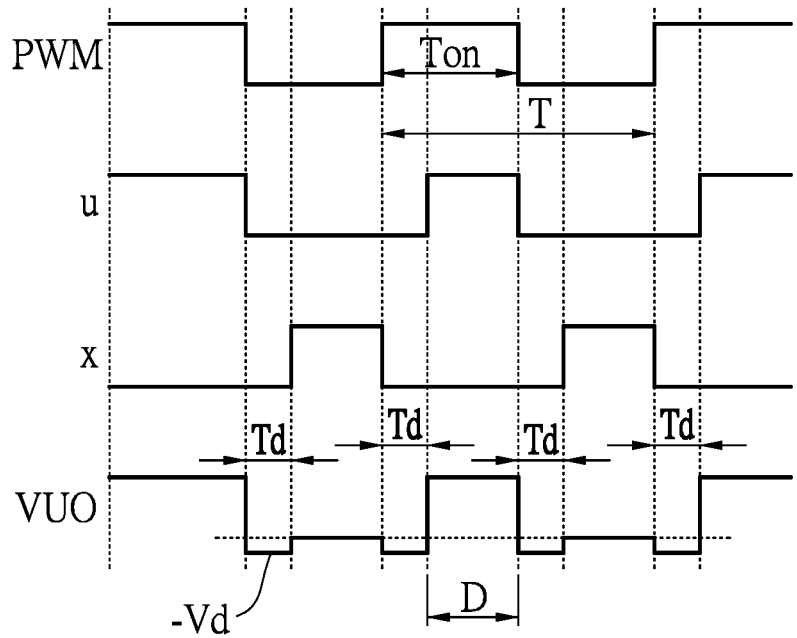
FIG. 2A and FIG. 2B are waveform views of the conventional multi-phase brushless DC motor driving circuit.
Figure 2B:
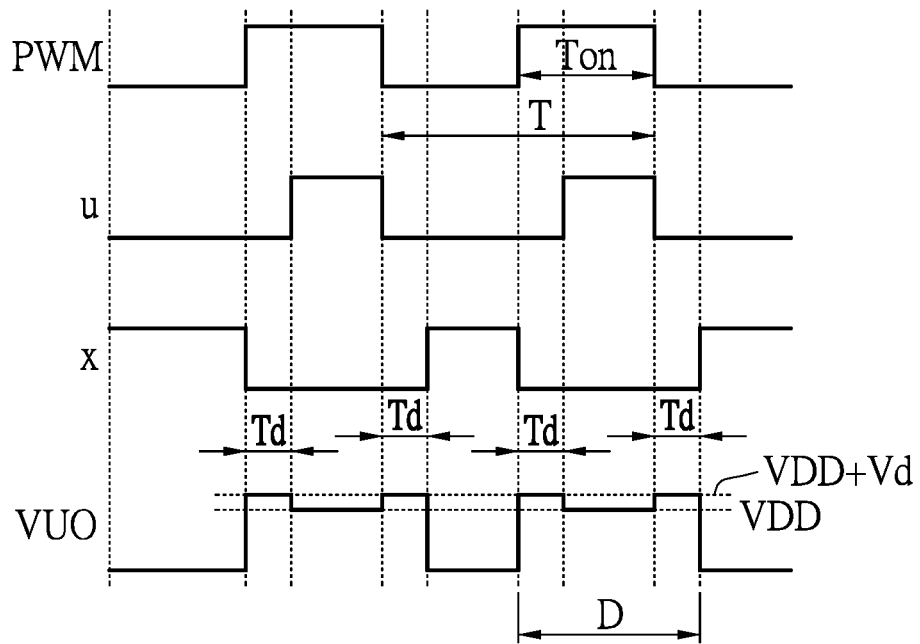

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Generally, a feature of a multi-phase brushless DC motor driving circuit in the present disclosure is to implement delay time (also referred to as dead time) to prevent a high-side transistor and a low-side transistor from being conducted at the same time, and to prevent an equivalent duty cycle of the driving-stage circuit from being shortened due to the delay time, so that the operation efficiency of the motor is not affected due to the delay time.

Embodiment of Multi-Phase Brushless DC Motor Driving Circuit

Figure 3:
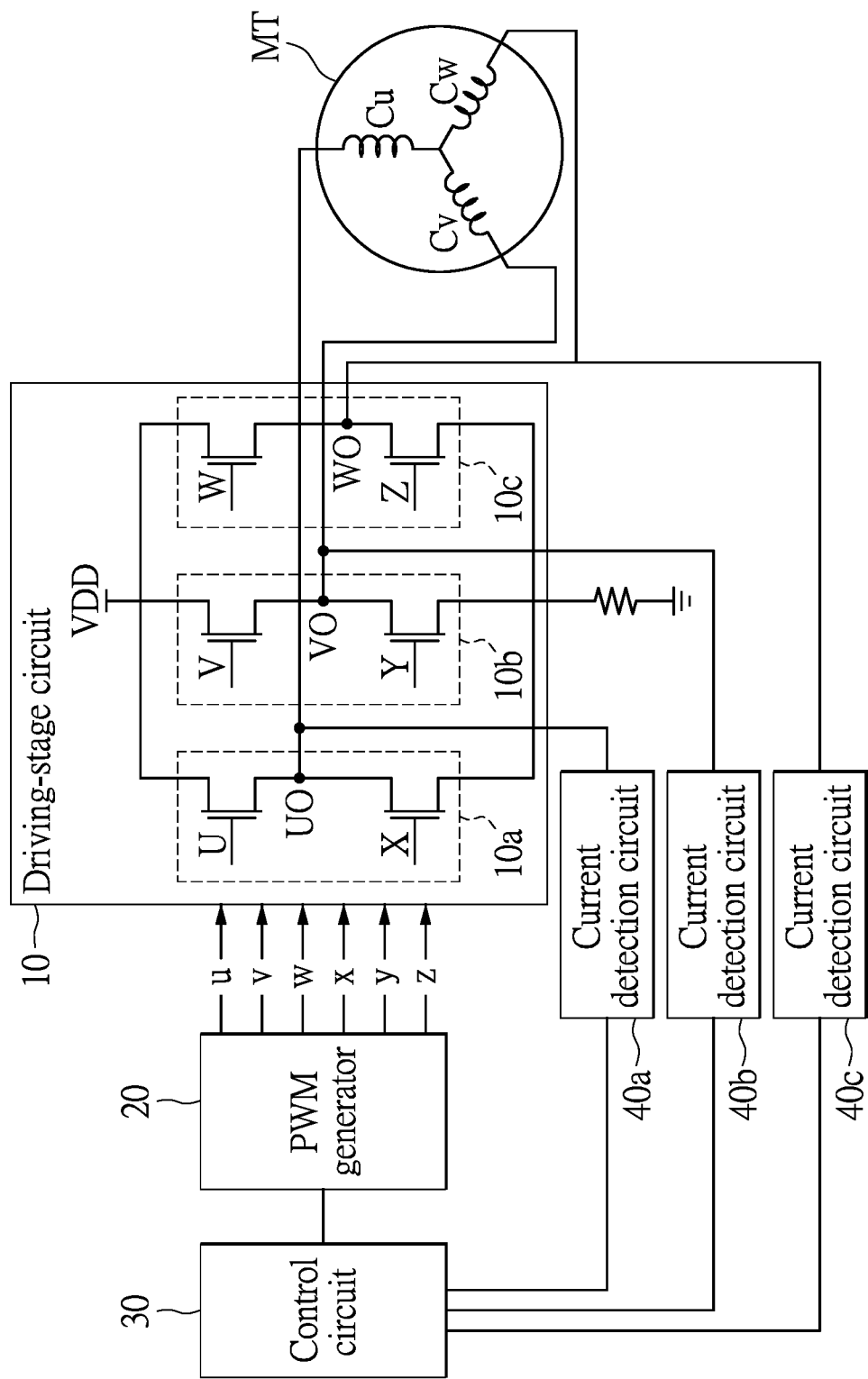
FIG. 3 is a schematic view illustrating a multi-phase brushless DC motor driving circuit according to one embodiment of the present disclosure.

Reference is made to FIG. 3, which is a schematic view illustrating a multi-phase brushless DC motor driving circuit according to one embodiment of the present disclosure. For ease of illustration, a three-phase brushless DC motor is taken as an example of the multi-phase brushless DC motor MT, but the multi-phase brushless DC motor driving circuit in the present embodiment is not limited to being used only to drive the three-phase brushless DC motor.

The multi-phase brushless DC motor driving circuit provided in the embodiment includes a driving-stage circuit 10, a PWM generator 20, a control circuit 30 and a plurality of current detection circuits 40. The PWM generator 20 is connected to the driving-stage circuit 10, and the control circuit 30 is connected to the PWM generator 20. The current detection circuits 40 are connected between the driving-stage circuit 10 and the control circuit 30.

The driving-stage circuit 10 includes a plurality of sub-driving circuits 10a-10c, which are connected in parallel with each other. The sub-driving circuit 10a includes a high-side transistor U and a low-side transistor X, the sub-driving circuit 10b includes the high-side transistor V and the low-side transistor Y, and the sub-driving circuit 10c includes the high-side transistor W and the low-side transistor Z. The driving-stage circuit 10 is connected to the coil Cu in the multi-phase brushless DC motor MT via the node UO between the high-side transistor U and the low-side transistor X. The driving-stage circuit 10 is connected to the coil Cv in the multi-phase brushless DC motor MT via the node VO between the high-side transistor V and the low-side transistor Y. The driving-stage circuit 10 is connected to the coil Cw in the multi-phase brushless DC motor MT via the node WO between the high-side transistor W and the low-side transistor Z.

The current detection circuits 40a-40c are respectively connected to the driving-stage circuit 10. Specifically, the current detection circuit 40a is connected to the node UO between the high-side transistor U and the low-side transistor X in the sub-driving circuit 10a, the current detection circuit 40b is connected to the node VO between the high-side transistor V and the low-side transistor Y in the sub-driving circuit 10b, and the current detection circuit 40c is connected to the node WO between the high-side transistor W and the low-side transistor Z in the sub-driving circuit 10c. The current detection circuits 40a-40c are respectively configured to detect currents transmitted through the node UO, the node VO and the node WO to generate a current detection signal.

Finally, the current detection signals generated by the current detection circuits 40a-40c are transmitted to the control circuit 30. According to the current detection signals, the control circuit 30 will control the PWM generator 20 to generate a plurality of PWM signals u-w and x-z to control the conducting and cutting off of the high-side transistors U, V, W and the low-side transistors X, Y, Z in each sub-driving circuit 10a-10c so as to provide a driving current to the coils Cu, Cv, Cw to drive the multi-phase brushless DC motor MT.

The following description will provide details on how the control circuit 30 controls the PWM generator 20 according to the current detection signal to generate a plurality of PWM signals u-w and x-z so as to control the conducting and cutting off of the high-side transistor U, V, W and the low-side transistor X, Y, Z in each of the sub-driving circuits 10a-10c.

In the embodiment, occurrence time of current zero-crossing points for each of the sub-driving circuits 10a-10c can be acquired according to the current detection signals. In other words, the transmitting directions of the currents at the node UO, the node VO and the node WO of the sub-driving circuits 10a-10c can be acquired according to the current detection signals. Taking the node UO for example, if the current detection signal generated by the current detection circuit 20 is high potential, it represents that the current flows to the node UO of the sub-driving circuit 10a. In contrast, if the current detection signal generated by the current detection circuit is low potential, it represents that the current flows from the node UO of the sub-driving circuit 10a.

Figure 4A:
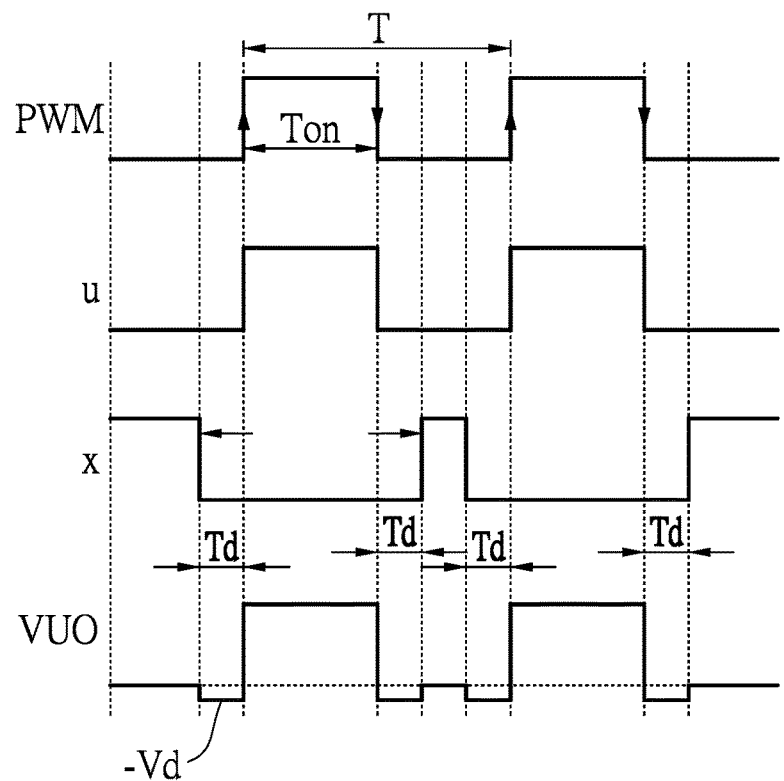
FIG. 4A and FIG. 4B are waveform views of the multi-phase brushless DC motor driving circuit in FIG. 3.
Figure 4B:
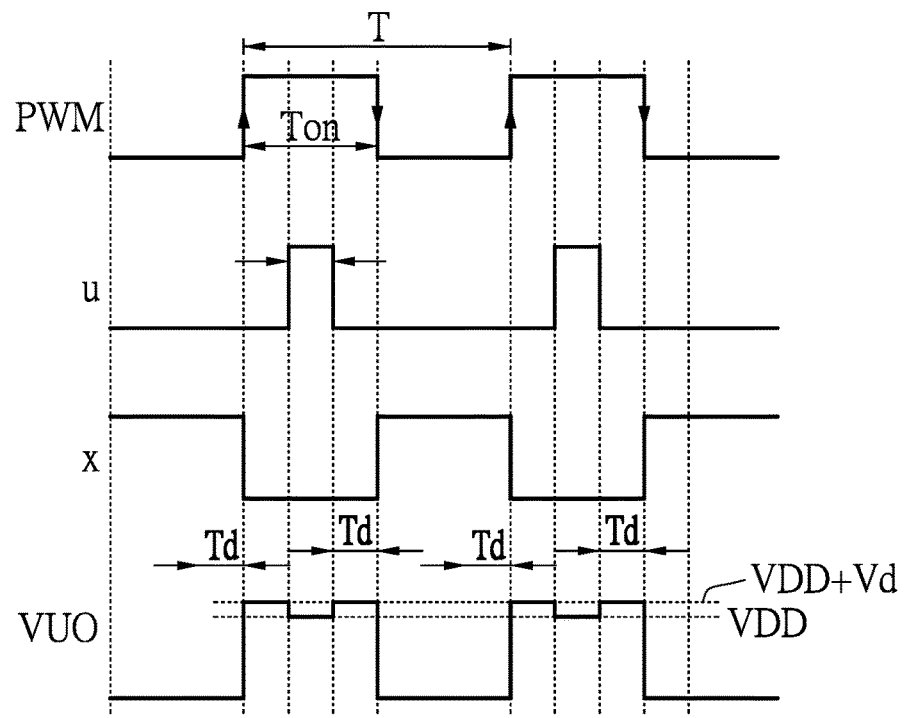

With reference to FIG. 4A and FIG. 4B, FIG. 4A and FIG. 4B are waveform views of the multi-phase brushless DC motor driving circuit in FIG. 3. It should be noted that principles for the control circuit 30 controlling the PWM generator 20 according to the current detection signals to generate the PWM signals u and x for the sub-driving circuit 10a, the PWM signal v and y for the sub-driving circuit 10b, and the PWM signals w and z for the sub-driving circuit 10c are the same. Therefore, for ease of illustration, the following description only focuses on the current transmitted to the node UO in the sub-driving circuit 10a.

FIG. 4A is a waveform view of the predetermined PWM signal of the PWM generator 20, the PWM signals u and w generated by the PWM generator 20 controlled by the control circuit 30, and the voltage VUO of the node UO in the sub-driving circuit 10a when the current detection signal generated by the current detection circuit 40a is low potential (i.e., when the current flows from the node UO in the sub-driving circuit 10a to the multi-phase brushless DC motor MT).

On the other hand, FIG. 4B is a waveform view of the predetermined PWM signal of the PWM generator 20, the PWM signals u and w generated by the PWM generator 20 controlled by the control circuit 30 and the voltage VUO of the node UO in the sub-driving circuit 10a when the current detection signal generated by the current detection circuit 40a is high potential (i.e., when the current flows from the multi-phase brushless DC motor MT to the node UO in the sub-driving circuit 10a).

As shown in FIG. 4A and FIG. 4B, when the control circuit 30 receives the current detection signal from the current detection circuit 40a, the control circuit 30 adjusts the predetermined PWM signal PWM of the PWM generator 20 according to the received current detection signal, and then controls the conducting or cutting off of the high-side transistor U and the low-side transistor X in the sub-driving circuit 10a according to the adjusted PWM signal u or the adjusted PWM signal x.

As shown in FIG. 4A, when the control circuit 30 receives the current detection signal with low potential from the current detection circuit 40a, the control circuit 30 will control the PWM generator 20 to provide the predetermined PWM signal PWM to be the PWM signal u so as to control the conducting or cutting off of the high-side transistor U. At the same time, the control circuit 30 will control the PWM generator 30 to provide the PWM signal x to control the conducting or cutting off of the low-side transistor X. It should be noted that the control circuit 30 will control the PWM generator 20 to delay the positive edge of the PWM signal that is complementary to the predetermined PWM signal PWM by the delay time Td and to advance the negative edge of the predetermined PWM signal PWM by the delay time Td so as to generate an adjustment PWM signal to be the PWM signal x. It should be noted that the threshold voltage of the body diode of the low-side transistor X is Vd and the supply voltage of the driving-stage circuit 10 is VDD, and further details thereof will be omitted herein.

Under this manner of operation, according to the waveform of the voltage VUO of the node UO in the sub-driving circuit 10a at FIG. 4A, when the multi-phase brushless DC motor MT is driven, during the time when the current flows from the node UO to the multi-phase brushless DC motor MT, the equivalent duty cycle of the driving-stage circuit 10 is Ton/T. In other words, the equivalent duty cycle of the driving-stage circuit 10 is equal to the duty cycle of the predetermined PWM signal PWM of the PWM generator 20.

On the other hand, as shown in FIG. 4B, when the control circuit 30 receives the current detection signal with high potential from the current detection circuit 40a, the control circuit 30 will control the PWM generator 20 to provide the PWM signal that is complementary with the predetermined PWM signal to be the PWM signal x so as to control conducting and cutting off the low-side transistor X. At the same time, the control circuit 30 will control the PWM generator 20 to provide the PWM signal u to control conducting and cutting off the high-side transistor U. It should be noted that the control circuit 30 will control the PWM generator to delay the positive edge of the predetermined PWM signal by the delay time Td and to advance the negative edge of the predetermined PWM signal PWM by the delay time Td so as to generate an adjustment PWM signal to be the PWM signal u. It should be noted that the threshold voltage of the body diode of the low-side transistor X is Vd and the supply voltage of the driving-stage circuit 10 is VDD, and further details thereof will be omitted herein.

Under this manner of operation, according to the waveform of the voltage VUO of the node UO of the sub-driving circuit 10a in FIG. 4B, when the multi-phase brushless DC motor MT is driven, during the time when the current flows from the multi-phase brushless DC motor MT to the node UO, the equivalent duty cycle of the driving-stage circuit 10 is Ton/T. In other words, the equivalent duty cycle of the driving-stage circuit 10 is also equal to the duty cycle of the predetermined PWM signal PWM of the PWM generator 20.

Assuming that the duty cycle of the high-side transistor U is D % (e.g., Ton/T FIG. 4A), the duty cycle of the low-side transistor X would be (100−D) % (e.g., Ton/T in FIG. 4B). Accordingly, when the multi-phase brushless DC motor MT is driven, the overall equivalent duty cycle of the driving-stage circuit 10 is D %−(100−D) %, which is equal to (2D−100)%. It should be noted that, in the multi-phase brushless DC motor driving circuit in the embodiment, the overall equivalent duty cycle of the driving-stage circuit 10 is irrelevant to the delay time Td. Therefore, even if the multi-phase brushless DC motor driving circuit provided in the embodiment implements the delay time to prevent the high-side transistor and the low-side transistor from being conducted at the same time, the equivalent duty cycle of the driving-stage circuit will not be shortened and the operation efficiency of the multi-phase brushless DC motor MT will not be affected. In other words, by comparing to the conventional art, in the multi-phase brushless DC motor driving circuit provided in the embodiment, since the PWM signal used to control the driving-stage circuit is adjusted, the equivalent duty cycle of the driving-stage circuit that is shortened due to the delay time is compensated.

Moreover, in the embodiment, since the equivalent duty cycle of the driving-stage circuit that is shortened due to the delay time is compensated, the variation of the driving current, which is generated by conducting or cutting off the high-side transistors U-W and the low-side transistors X-Z in the driving-stage circuit 10, is shortened, a vibration condition in the multi-phase brushless DC motor MT can be improved.

The following description describes how the PWM generators implement the delay time to generate the aforementioned PWM signal u or PWM signal x.

Figure 5A:
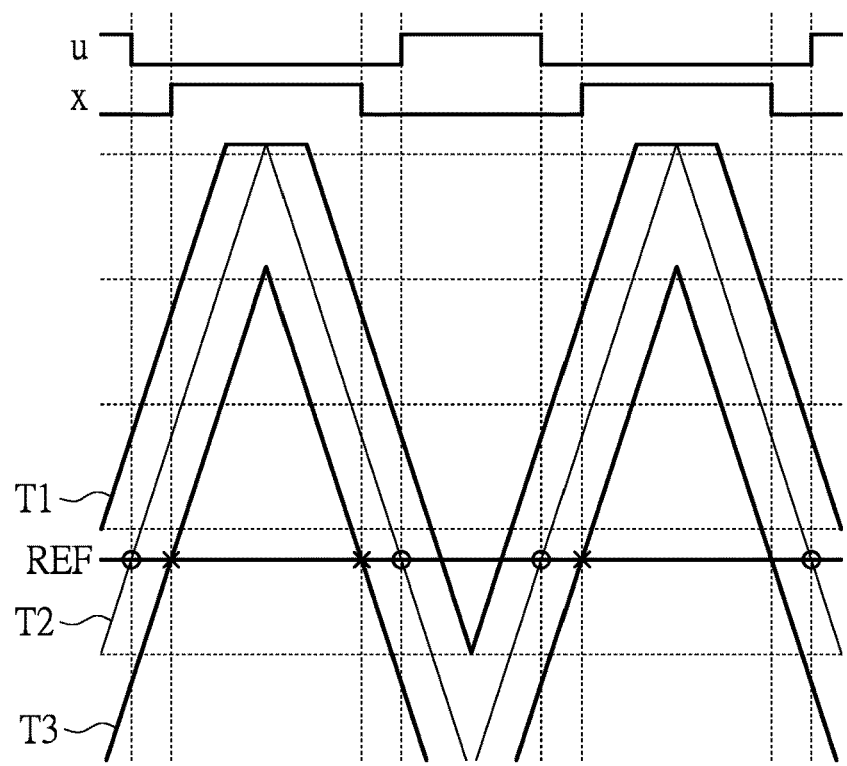
FIG. 5A and FIG. 5B are waveform views of the PWM generator in the multi-phase brushless DC motor driving circuit according to one embodiment of the present disclosure in operation.
Figure 5B:
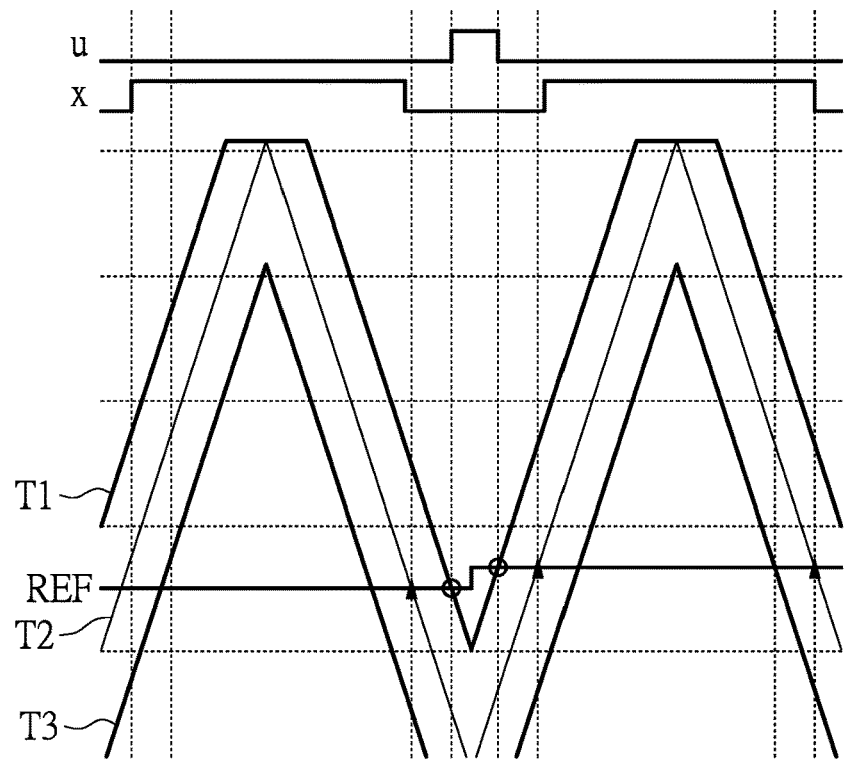

Reference is made to FIG. 5A and FIG. 5B, which are waveform views when the PWM generator in the multi-phase brushless DC motor driving circuit is operated according to one embodiment of the present disclosure.

As shown in FIG. 5A and FIG. 5B, the PWM generator 20 represents the predetermined PWM signal, the PWM signal u or generating the PWM signal x according to the reference signal REF and the first triangular wave T1, the second triangular wave T2 or the third triangular wave T3. It should be noted that, as shown in FIG. 5, the first triangular wave T1 is greater than the second triangular wave T2 by a voltage difference Vtd. The third triangular wave T3 is less than the second triangular wave T2 by the voltage difference Vtd, and the voltage difference Vtd is related to the delay time Td.

FIG. 5A is a waveform view illustrating that the PWM generator 20 is operated when the control circuit 30 receives the current detection signal with low potential (i.e., when the current flows from the node UO in the sub-driving circuit 10a to the multi-phase brushless DC motor MT). As shown in FIG. 5A, the PWM generator 20 generates the PWM signal u according to the reference signal REF and the second triangular wave T2, and also generates the PWM signal x according to the reference signal REF and the third triangular signal T3. On the other hand, FIG. 5B is a waveform view illustrating that the PWM generator 20 is operated when the control circuit 30 receives the current detection signal with high potential (i.e., when the current flows from the node UO in the sub-driving circuit 10a to the multi-phase brushless DC motor MT). As shown in FIG. 5B, the PWM generator 20 generates the PWM signal x according to the reference signal REF and the second triangular wave T2, and also generates the PWM signal u according to the reference signal REF and the first triangular signal T1.

Another Embodiment of Multi-Phase Brushless DC Motor Driving Circuit

The circuit structure and the operating principle of the multi-phase brushless DC motor driving circuit provided in the present embodiment is roughly the same as the multi-phase brushless DC motor driving circuit shown in FIG. 3. Therefore, the following description concerns the differences between the multi-phase brushless DC motor driving circuits in the present embodiment and FIG. 3. Other details not described in this embodiment can be referred to in the aforementioned embodiments.

Figure 6:
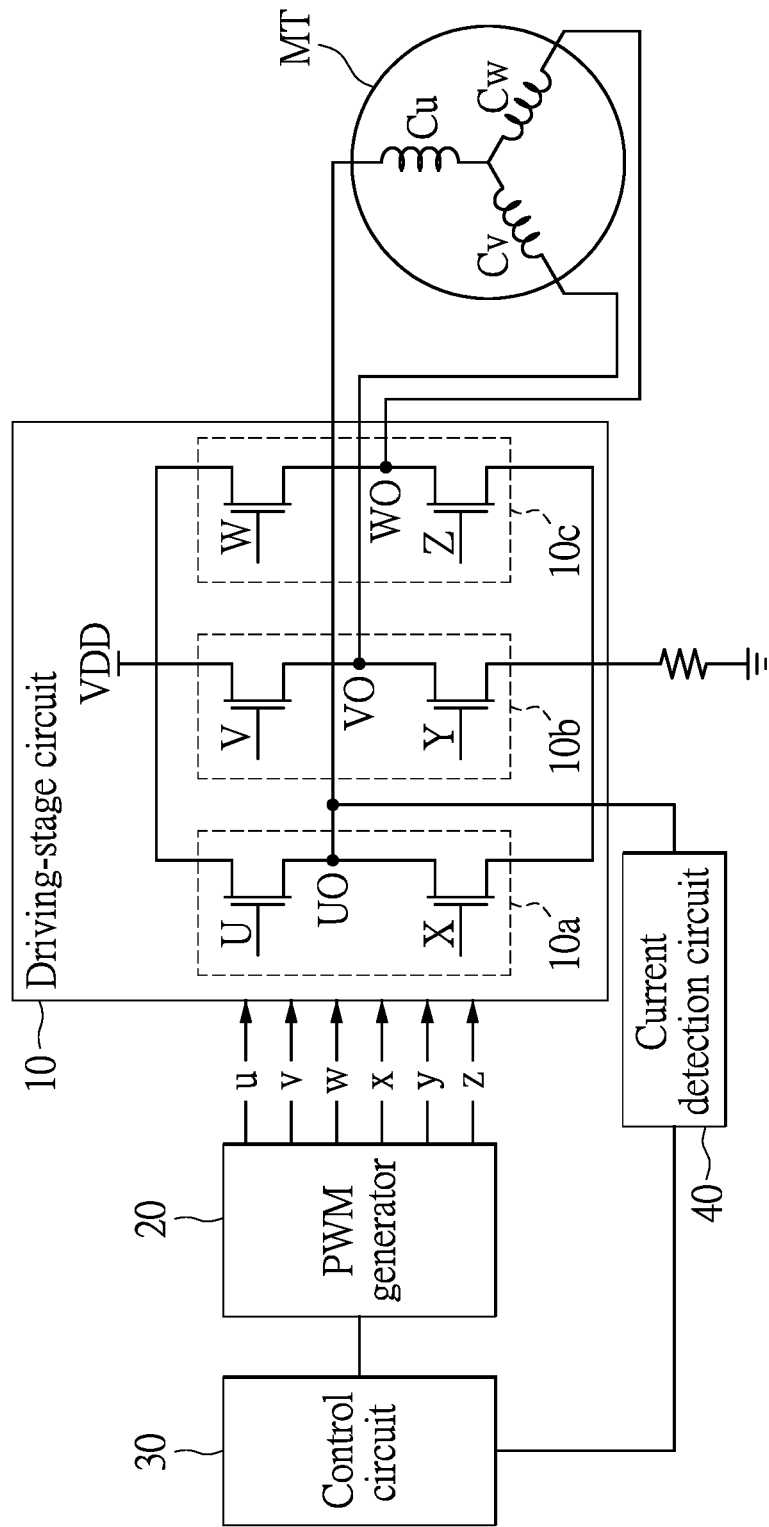
FIG. 6 is a schematic view of a multi-phase brushless DC motor driving circuit according to another embodiment in the present disclosure.

Reference is made to FIG. 6, which is a schematic view of a multi-phase brushless DC motor driving circuit according to another embodiment in the present disclosure.

As shown in FIG. 6, the multi-phase brushless DC motor driving circuit provided in the present embodiment includes a driving-stage circuit 10, a PWM generator 20, a control circuit 30 and a current detection circuit 40. The main difference between the multi-phase brushless DC motor driving circuits in the present embodiment and FIG. 4 is that only one current detection circuit 40 is installed in the present embodiment and the detection circuit 40 is disposed between the control circuit 30 and the sub-driving circuit 10a, the sub-driving circuit 10b or the sub-driving circuit 10c. According to different requirements in circuit design, the detection circuit 40 can be disposed between the control circuit 30 and the sub-driving circuit 10a to detect the current transmitting through the node UO in the sub-driving circuit 10 so as to generate a current detection signal to the control circuit 30. Alternatively, the detection circuit 40 can also be disposed between the control circuit 30 and the sub-driving circuit 10b to detect the current transmitting through the node VO in the sub-driving circuit 10 so as to generate the current detection signal to the control circuit 30. Alternatively, the detection circuit 40 can be disposed between the control circuit 30 and the sub-driving circuit 10c to detect the current transmitting through the node WO in the sub-driving circuit 10 so as to generate the current detection signal to the control circuit 30.

For ease of illustration, the detection circuit 40 is exemplified as being disposed between the control circuit 30 and the sub-driving circuit 10a, as shown in FIG. 6, in the following description.

When the control circuit 30 receives the current detection signal, the occurrence time of the current zero-crossing point of the sub-driving circuit 10a is acquired according to the current detection signal. In other words, by the current detection signal, the control circuit 30 is able to determine the transmitting direction of the current at the node UO in the sub-driving circuit 10a. Then, since the phase difference among the current transmitting at the node UO in the sub-driving circuit 10a, the current transmitting at the node VO in the sub-driving circuit 10b and the current transmitting at the node WO in the sub-driving circuit 10c is 120 degrees, after calculating the current at the node UO in the sub-driving circuit 10a, the control circuit 30 is able to calculate the current signal at the node VO in the sub-driving circuit 10b and the current signal at the node WO in the sub-driving circuit 10c. The occurrence time of the current zero-crossing point in the sub-driving circuit 10b and the sub-driving circuit 10c is acquired according to the current signal at the node VO in the sub-driving circuit 10b. In other words, according to the current signals, the control circuit 30 is able to calculate the transmitting direction of the current at the node VO in the sub-driving circuit 10b and at the node WO in the sub-driving circuit 10c.

Finally, the control circuit 30 will generate the PWM signals u-w and x-y according to the currents flowing through the node UO in the sub-driving circuit 10a, through the node VO in the sub-driving circuit 10b and through the node WO in the sub-driving circuit 10c to control the high-side transistors U, V, W and the low-side transistors X, Y, Z in each of the sub-driving circuits 10a, 10b and 10c so as to provide the driving current to drive the multi-phase brushless DC motor MT.

Since the principle of the control circuit 30 controlling the PWM generator 20 according to the current detection signal to generate the PWM signals u and x to the sub-driving circuit 10a is the same as the principle of the control circuit 30 controlling the PWM generator 20 according to the current detection signals to generate the PWM signals v and y to the sub-driving circuit 10b and the PWM signals w and z to the sub-driving circuit 10c. For ease of illustration, the following description focuses only on the current flowing through the node UO in the sub-driving circuit 10a.

Generally, as shown in FIG. 4A and FIG. 4B, for the node UO, when the current flows from the node UO between the high-side transistor U and the low-side transistor X in the sub-driving circuit 10a, the control circuit 30 will control the PWM generator 20 to generate the predetermined PWM signal to the high-side transistor U in the sub-driving circuit 10a and also control the PWM generator 20 to delay the positive edge of the PWM signal that is complementary to the predetermined PWM signal PWM by the delay time Td and advance the negative edge thereof by the delay time Td so as to generate the adjustment PWM signal to the low-side transistor X in the sub-driving transistor 10a. On the other hand, when the current flows to the node UO between the high-side transistor U and the low-side transistor X in the sub-driving circuit 10a, the control circuit 30 controls the PWM generator 20 to generate the PWM signal that is complementary to the predetermined PWM signal to the low-side transistor X in the sub-driving circuit 10a, and control the PWM generator 30 to delay the positive edge of the predetermined PWM signal PWM by the delay time Td and advance the negative edge of the predetermined PWM signal PWM by the delay time Td so as to generate the adjustment PWM signal to the high-side transistor U of the sub-driving circuit 10a.

Under this manner of operation, the multi-phase brushless DC motor driving circuit provided in the embodiment implements the delay time to prevent the high-side transistor and the low-side transistor in the driving-stage circuit from being conducted at the same time, so that the equivalent duty cycle of the driving-stage circuit will not be shortened and the operational efficiency of the multi-phase brushless DC motor MT will not be affected.

In summary, the multi-phase brushless DC motor driving circuit provided in the present disclosure implements the delay time to prevent the high-side transistor and the low-side transistor in the driving-stage circuit from being conducted at the same time to cause circuit damage. At the same time, the multi-phase brushless DC motor driving circuit provided in the present disclosure determines the flow direction of the current according to the current zero-crossing point in each sub-driving circuit so as to adjust the PWM signal, which is used to control the conducting and cutting off of the high-side transistor and the low-side transistor in each sub-driving circuit.

Since the PWM signal is used to properly control the conducting and cutting off of the high-side transistor and the low-side transistor in each sub-driving circuit, the delay time is used to prevent the high-side transistor and the low-side transistor in the driving-stage circuit from being conducted at the same time, and the equivalent duty cycle of the driving-stage circuit will not be shortened, and the operational efficiency of the multi-phase brushless DC motor will not be sacrificed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-phase brushless DC motor driving circuit for providing a driving current to drive a multi-phase brushless DC motor, comprising:
    a driving-stage circuit including a plurality of sub-driving circuits, which are parallel to each other, each of the sub-driving circuits having a high-side transistor and a low-side transistor;

a pulse width modulation (PWM) generator connected to the driving-stage circuit;

a control circuit connected to the PWM generator; and a plurality of current detection circuits respectively connected between the driving-stage circuit and the control circuit, and configured to detect currents at a node between the high-side transistor and the low-side transistor to generate a plurality of current detection signals;

wherein the control circuit controls the PWM generator according to the current detection signals to generate a plurality of PWM signals and control the conducting and cutting off of the high-side transistor and the low-side transistor at each of the sub-driving circuits so as to provide the driving current to drive the multi-phase brushless DC motor;

wherein if the current detection signal is low potential, it represents that the current flows from the node between the high-side transistor and the low-side transistor in the sub-driving circuits; if the current detection signal is high potential, it represents that the current flows to the node between the high-side transistor and the low-side transistor in the sub-driving circuits.

2. The multi-phase brushless DC motor driving circuit according to claim 1, wherein when the control circuit receives the current detection signal with low potential, the control circuit controls the PWM generator to generate a predetermined PWM signal to the high-side transistor of the sub-driving circuits, and to generate an adjustment PWM signal to the low-side transistor of the sub-driving circuits;

wherein when the control circuit receives the current detection signal with high potential, the control circuit controls the PWM generator to generate one of the PWM signals that is complementary to the predetermined PWM signal to the low-side transistor of the sub-driving circuit, and another one of the PWM signals to the high-side transistor of the sub-driving circuit.

3. The multi-phase brushless DC motor driving circuit according to claim 2, wherein when the control circuit receives the current detection signal with low potential, the control circuit controls the PWM generator to delay a positive edge by a delay time and to advance a negative edge by the delay time for the predetermined PWM signal, which is complementary to the PWM signal, to generate the adjustment PWM signal to the low-side transistor of the corresponding sub-driving circuit;

wherein when the control circuit receives the current detection signal with high potential, the control circuit controls the PWM generator to delay the positive edge by the delay time and to advance the negative edge by the delay time for the predetermined PWM signal, which is complementary to the PWM signal, to generate the another adjustment PWM signal to the high-side transistor of the corresponding sub-driving circuit.

4. The multi-phase brushless DC motor driving circuit according to claim 3, wherein the PWM signals are generated according to a reference signal and a first triangular wave, a second triangular wave or a third triangular wave, and the first triangular wave is greater than the second triangular wave by a voltage difference, the third triangular wave is less than the second triangular wave by the voltage difference, and the voltage difference is related to the delay time.

5. The multi-phase brushless DC motor driving circuit according to claim 4, wherein when the control circuit receives the current detection signal with low potential, the control circuit generates the predetermined PWM signal according to the reference signal and the second triangular wave, and generates the adjustment PWM signal according to the reference signal and the third triangular wave;

wherein when the control circuit receives the current detection signal with high potential, the control circuit generates the predetermined PWM signal according to the reference signal and the second triangular wave, and generates the adjustment PWM signal according to the reference signal and the third triangular wave.

6. The multi-phase brushless DC motor driving circuit according to claim 3, wherein an equivalent duty cycle of the driving-stage circuit is not related to the delay time.

7. The multi-phase brushless DC motor driving circuit according to claim 1, wherein the multi-phase brushless DC motor is a three-phase brushless DC motor.

8. A multi-phase brushless DC motor driving circuit for providing a driving current to drive a multi-phase brushless DC motor, comprising:

a driving-stage circuit including a plurality of sub-driving circuits, which are parallel to each other, each of the sub-driving circuits having a high-side transistor and a low-side transistor;

a pulse width modulation (PWM) generator connected to the driving-stage circuit;

a control circuit connected to the PWM generator; and a current detection circuit respectively connected between the driving-stage circuit and the control circuit, and configured to detect a current at a node between the high-side transistor and the low-side transistor to generate a current detection signal;

wherein the control circuit performs a calculation according to the current detection signal to control the PWM generator to generate a plurality of PWM signals and control the conducting and cutting off of the high-side transistor and the low-side transistor at each of the sub-driving circuits so as to provide the driving current to drive the multi-phase brushless DC motor;

wherein if the current detection signal is low potential, it represents that the current flows from the node between the high-side transistor and the low-side transistor in the sub-driving circuits, if the current detection signal is high potential, it represents that the current flows to the node between the high-side transistor and the low-side transistor in the sub-driving circuits.

9. The multi-phase brushless DC motor driving circuit according to claim 8, wherein the control circuit calculates a current signal of the node between the high-side transistor and the low-side transistor among the sub-driving circuits to determine whether the current flows to or flows from the node between the high-side transistor and the low-side transistor among the sub-driving circuits.

10. The multi-phase brushless DC motor driving circuit according to claim 9, wherein a phase difference between the current signals and the current detection signal is 1200;

wherein if the current signal is low potential, it represents that the current flows from the node between the high-side transistor and the low-side transistor in the sub-driving circuits, if the current signal is high potential, it represents that the current flows to the node between the high-side transistor and the low-side transistor in the sub-driving circuits.

11. The multi-phase brushless DC motor driving circuit according to claim 10,
wherein when the current flows from the node between the high-side transistor and the low-side transistor in the sub-driving circuits, the control circuit controls the PWM generator generates a predetermined PWM signal to the high-side transistor of the sub-driving circuit and an adjustment PWM signal to the low-side transistor of the sub-driving circuit;
wherein when the current flows to the node between the high-side transistor and the low-side transistor in the sub-driving circuits, the control circuit controls the PWM generator to generate one of the PWM signals that is complementary to the predetermined PWM signal to the low-side transistor of the sub-driving circuit, and to generate another one of the PWM signals to the high-side transistor of the sub-driving circuit.

12. The multi-phase brushless DC motor driving circuit according to claim 11,
wherein when the current flows from the node between the high-side transistor and the low-side transistor in the sub-driving circuits, the control circuit controls the PWM generator to delay a positive edge by a delay time and to advance a negative edge by the delay time for the predetermined PWM signal, which is complementary to the PWM signal, to generate the adjustment PWM signal to the low-side transistor of the corresponding sub-driving circuit;
wherein when the current flows from the node between the high-side transistor and the low-side transistor in the sub-driving circuits, the control circuit controls the PWM generator to delay the positive edge by the delay time and to advance the negative edge by the delay time for the predetermined PWM signal, which is complementary to the PWM signal, to generate the another adjustment PWM signal to the high-side transistor of the corresponding sub-driving circuit.

13. The multi-phase brushless DC motor driving circuit according to claim 12,
wherein the PWM signals are generated according to a reference signal and a first triangular wave, a second triangular wave or a third triangular wave, and the first triangular wave is greater than the second triangular wave by a voltage difference, the third triangular wave is less than the second triangular wave by the voltage difference, and the voltage difference is related to the delay time.

14. The multi-phase brushless DC motor driving circuit according to claim 13,
wherein when the control circuit receives the current detection signal with low potential, the control circuit generates the predetermined PWM signal according to the reference signal and the second triangular wave and generates the adjustment PWM signal according to the reference signal and the third triangular wave;
wherein when the control circuit receives the current detection signal with high potential, the control circuit generates the predetermined PWM signal according to the reference signal and the second triangular wave and generates the adjustment PWM signal according to the reference signal and the third triangular wave.

15. The multi-phase brushless DC motor driving circuit according to claim 12, wherein an equivalent duty cycle of the driving-stage circuit is not related to the delay time.

16. The multi-phase brushless DC motor driving circuit according to claim 8, wherein the multi-phase brushless DC motor is a three-phase brushless DC motor.

* * * * *